United States Patent [19]
Llewellyn

[11] 3,712,111
[45] Jan. 23, 1973

[54] FLOW CONTROL FOR GAS ANALYZING APPARATUS

[75] Inventor: Peter M. Llewellyn, Menlo Park, Calif.

[73] Assignee: Vanan Associates, Palo Alto, Calif.

[22] Filed: July 10, 1968

[21] Appl. No.: 743,852

Related U.S. Application Data

[63] Continuation-in-part of Ser. No. 551,756, Dec. 6, 1965, Pat. No. 3,455,092.

[52] U.S. Cl. .................................73/23.1, 250/41.9 G
[51] Int. Cl. .........................B01d 59/44, G01n 31/08
[58] Field of Search........73/23.1; 250/41.9, 41.9 GS; 23/232 C, 254 E, 255 E; 55/16, 158

[56] References Cited

UNITED STATES PATENTS

| | | | |
|---|---|---|---|
| 3,124,952 | 3/1964 | Johnson | 73/23.1 |
| 3,169,389 | 2/1965 | Green | 73/23.1 |
| 3,291,980 | 12/1966 | Coates et al. | 250/41.9 |
| 3,400,514 | 9/1968 | Noda | 73/23.1 X |
| 3,405,549 | 10/1968 | Finley | 73/23.1 |
| 3,455,092 | 7/1969 | Llewellyn | 73/23.1 X |
| 3,429,105 | 2/1969 | Llewellyn et al. | 73/23.1 X |
| 3,471,692 | 10/1969 | Llewellyn et al. | 73/23.1 UX |
| 3,479,798 | 11/1969 | Ryhage | 73/23.1 X |

OTHER PUBLICATIONS

Lipsky et al. "Utilization of System Employing the Selective Permeation of Helium Through a Unique Membrane of Teflon as an Interface for G20 Chromatograph and Mass Spectrometer"–Analytical Chemistry–Vol. 38, No. 11, October, 1966, pp. 1585–1587.

Primary Examiner—James J. Gill
Assistant Examiner—C. E. Snee, III
Attorney—Leon F. Herbert

[57] ABSTRACT

A gas chromatograph-mass spectrometer system including means for varying the amount of throughput from chromatograph to spectrometer without physically altering the flow path therebetween. A valve means is inserted in the effluent flow path of the chromatograph downstream of the spectrometer inlet system so that the exhaust port flow path may be constricted to unbalance the pressure differentials in the chromatograph detector flow path and the main flow path downstream of the splitter thus enabling the effective split ratio to be selectively varied without affecting the geometry of the flow stream connecting the chromatograph and spectrometer.

8 Claims, 2 Drawing Figures

INVENTOR.
PETER M. LLEWELLYN
BY Wm G. Nolan
ATTORNEY

FLOW CONTROL FOR GAS ANALYZING APPARATUS

This is a continuation-in-part of application Ser. No. 551,756 filed Dec. 6, 1965, by applicant entitled "Gas Analyzer Inlet System For Gaseous State Materials," now U. S. Pat. No. 3,455,092 issued July 15, 1969.

STATEMENT OF THE INVENTION

The invention relates generally to gas analyzing apparatus and more specifically to a gas analyzing system including a gas chromatograph and a mass spectrometer, and means for controlling the ratio of throughput from the output of the gas chromatograph to the input of the mass spectrometer without physical alterations of the flow path therebetween.

DESCRIPTION OF THE PRIOR ART

Among the most sensitive instruments available to the chemist are the gas chromatograph and the mass spectrometer. The basic characteristic of the gas chromatograph lies in its ability to separate and make quantitative measurements of gaseous mixtures. Its qualitative measurement capability, however, is limited and is dependent upon precision calibration and further experimentation. The principal advantage of the mass spectrometer resides in its great sensitivity and the amount of qualitative information which it is capable of providing. These differing capabilities of the respective devices are among the factors which have led to the desirability of a combination of the methods of gas chromatography and mass spectrometry in a single analytical system.

Fortunately the two devices have an important facet in common. The amount of sample material which each can normally handle is roughly in the same range, i.e., for nanograms to fractional milligrams. However, the two devices differ in other important aspects which must be provided for before they can be connected together in a continuous flow system. One aspect of primary concern is the fact that the chromatograph causes the constituents of the sample to be time concentrated so that in the case of certain sample materials, which have one or more unusually large peaks, the input capability of the mass spectrometer may be momentarily exceeded due to the large concentration of the large peaks. Another is that the gas chromatograph operates at near atmospheric pressure and above while the mass spectrometer operates at a high vacuum. In addition, the gross carrier gas and sample gas mixture in the chromatograph flows in a rate far in excess of the permissible flow of material in the ion source of the mass spectrometer.

Where the detector of the gas chromatograph is designed to give a quantitative measurement of the amount of sample gas flowing through the system and is substantially unaffected by the larger proportion of carrier gas, the ion source of the qualitative measuring mass spectrometer requires that its gaseous sample input be introduced at a substantially reduced pressure and be as free of carrier gas contamination as is possible. These dissimilarities would tend to make the two devices incompatible as a continuous flow system were it not for the use of a mass spectrometer inlet system allowing the required pressure reduction and separation of the sample from the carrier gas before the effluent is supplied to the ion source of the mass spectrometer.

Inlet systems having these capabilities are disclosed in the copending applications Ser. No. 511,756 filed Dec. 6, 1965, now U.S. Pat. No. 3,455,092 issued July 15, 1969 and Ser. No. 563,235 filed July 6, 1966, now U.S. Pat. No. 3,429,105 issued Feb. 25, 1969, as a continuation-in-part of U.S. Pat. application Ser. No. 511,794 filed Dec. 6, 1965, and now abandoned all of which are assigned to the assignee of the present invention.

In using these types of inlet systems as an interface between the gas chromatograph and the mass spectrometer, it has been found that due to the rapid transmission rate of the membrane, the unusually large sample peaks of some materials are sometimes introduced into the mass spectrometer in quantities large enough to momentarily exceed the input capability of the spectrometer, thus causing it to shut itself down in order to prevent possible damage due to the overload.

One possible solution to this problem is to reduce the percentage of the chromatograph effluent to be applied to the input of the mass spectrometer through the inlet system. The difficulty here though, is the manner in which this is to be accomplished. In prior art apparatus a flow splitting device was used to supply a fixed percentage of the chromatograph effluent to the mass spectrometer inlet system. The amount of sample introduced could then be selected accordingly so as not to overload the spectrometer. Although workable in the case of samples known to have large peaks this method impairs the ability of the spectrometer to identify the constituents of very small peaks also appearing in the chromatograph effluent and is thus not usually a suitable method.

In another attempt to solve the problem variable valve means were inserted between the chromatograph effluent and the spectrometer inlet system in order to enable the percentage of chromatograph effluent supplied to the inlet system to be varied selectively. This, however, was found, especially in glass systems, to be an inadequate means of providing control of the percentage of flow because of the effect which the valve had on the flow conditions of the connecting tubulation as well as the difficulty of providing a leakless valve means which would not allow contaminations of the chromatograph effluent. Mechanically variable splitter means are similarly unsuited to this application.

OBJECTS OF THE INVENTION

It is therefore a principal object of the present invention to provide a means by which the percentage of chromatograph effluent supplied to the input of the mass spectrometer may be selectively controlled so as to enable better compatibility between the operation of the two types of apparatus.

Another object of the present invention is to provide a flow control means which does not increase the probability of contamination of the chromatograph effluent before it is provided to the inlet system of the mass spectrometer.

Still another object of the present invention is to provide a flow control means whereby the percentage throughput from the output of a gas chromatograph to the input of a mass spectrometer can be varied without the use of valve means in the connecting flow path and therefore without perturbing the fluid flow stream in the interconnecting tubulation between the two apparatus.

Still other objects and advantages of the present invention will become apparent to those of skill in the art after reading the following description of a preferred embodiment which is illustrated in the drawing wherein:

IN THE DRAWING

DESCRIPTION OF THE PREFERRED EMBODIMENTS

Figure 1:
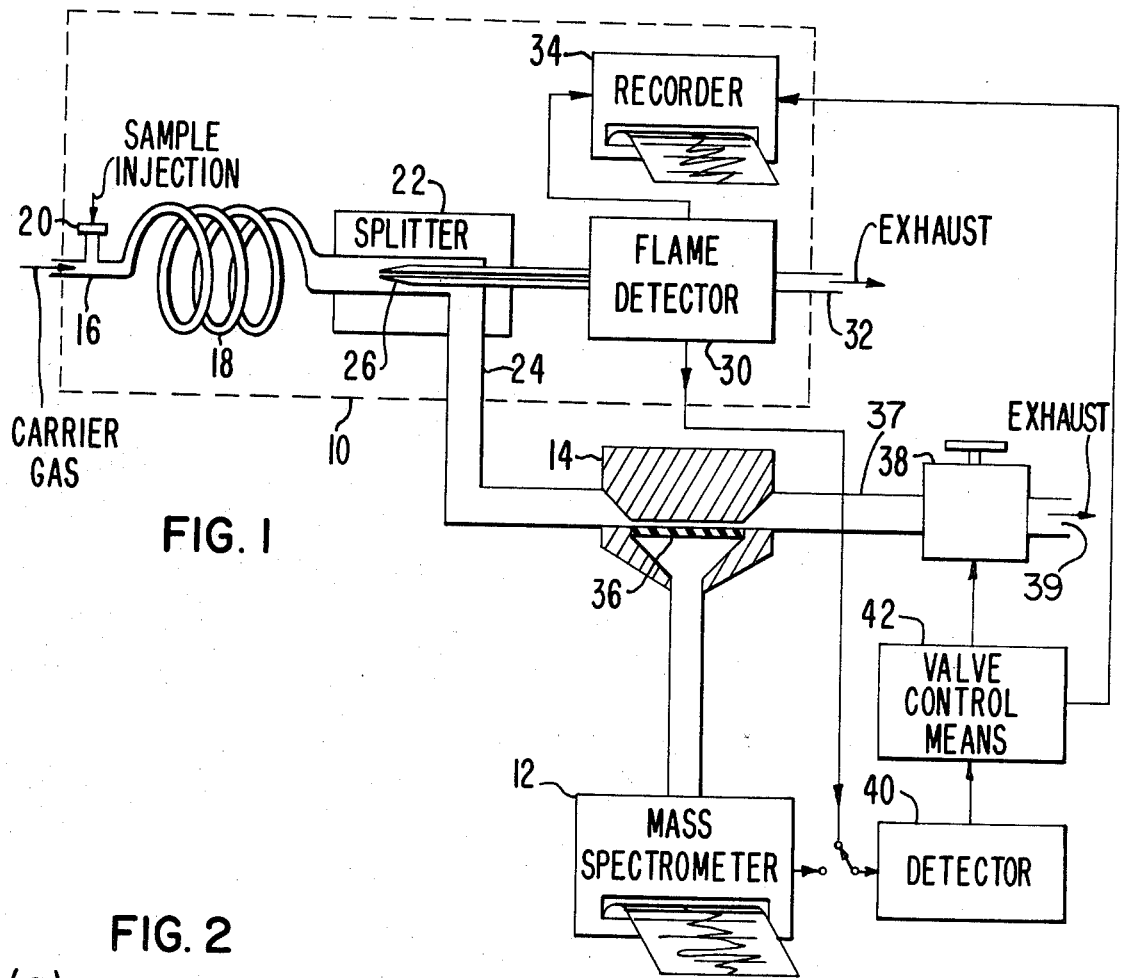
FIG. 1 is a schematic representation of a gas chromatograph-mass spectrometer gas analyzing system including flow control means in accordance with the present invention.

Referring now to the drawing there is shown a gas chromatograph 10 and a mass spectrometer 12 which are coupled together by a permeable membrane type inlet apparatus 14 as described in the aforementioned copending applications. The gas chromatograph 10 includes an inlet port 16 into which carrier gas is supplied to a chromatographic column 18. Inserted between the carrier gas inlet port 16 and the inlet end of the chromatographic column 18 is a sample injection port 20 through which a sample to be analyzed may be injected into the flow stream of the apparatus by hypodermic injection or any of the other methods well-known in the prior art. At the outlet end of the chromatographic column 18 a gas flow splitter means 22 is inserted in the connecting tubulation 24 between the inlet system 14 and the column 18. The splitter 22 may be of the type disclosed in copending U.S. application Ser. No. 666,618 filed Sept. 11, 1967, now U.S. Pat. No. 3,498,027 and assigned to the assignee of the present invention or of any other suitable type. Splitter 22 is essentially comprised of a tapered conduit 26 which extends into the flow tubulation 24 so as to permit, in accordance with well-known fluid dynamics principles, a portion (usually from 1 percent to 10 percent) of the flow through the tube 24 to be removed through an orifice 28 and passed through a detection apparatus such as the flame detector 30 before being exhausted to atmosphere through an exhaust port 32. The output of the flame detector is provided through a recording means 34 which provides a permanent record of the quantitative analytical condition which is provided by the chromatograph 10.

The major portion of the chromatographic effluent, typically about 90 percent, passes around the conduit 26 and through the tubulation 24 through the inlet 14 of the mass spectrometer 12 such that it is brought into contact with a permeable membrane 36 whereby the organic constituents in the effluent are captured by the membrane and caused to permeate therethrough so as to be introduced into the ion source of the mass spectrometer 12. The remaining carrier gas passes over the membrane and is exhausted to atmosphere through port 37. Although the inlet system is shown as a single stage separator, it is apparent that a plural stage separator such as disclosed in the aforementioned applications or other similar apparatus may likewise be used.

In order to control the percentage of flow which reaches the inlet system 14, a throttle valve means 38 is provided in the exhaust tubulation of the inlet system 14 for restricting the flow path of the exiting fluid.

Since the flow of gases from the gas chromatograph 10 is viscous, the split ratio of the splitter 22 is determined by the relationship between the fluid pressure conditions in the tubulation 24 and splitter conduit 28. With the valve means 38 fully open so that the downstream side of the membrane separator 14 is essentially at atmospheric pressure, the geometry of the particular splitter means chosen for this illustrative embodiment produces a split ratio S of 0.1, i.e., 10 percent ($Q_1$) of the total chromatographic effluent $Q_T$ is caused to pass through conduit 28 to the flame detector 30 before being exhausted to atmosphere and 90 percent ($Q_2$) flows through the tubulation 24 to separator 12. In other words, to provide a 0.1 split ratio the geometry of the splitter 22 with relation to the tubulation 24 is chosen so as to take into account the flow conditions in the flow paths through the separator 14 and detector 30 respectively. By defining $Q_T$ as $$Q_T = Q_1 + Q_2 \qquad (1)$$

then the split ratio S may be defined as $$S = Q_1/Q_2 \qquad (2)$$

If the pressure at the splitter 22 is $P_1$ and the pressure $P_x$ at the exhaust port 37 is atmospheric ($P_x = P_o$), i.e., the valve 38 is fully opened, 10 percent of the chromatographic effluent flow ($Q_1$) is directed to the detector 30 and 90 percent ($Q_2$) is passed through the separator 14. However, if the exhaust flow path at port 37 is constricted by partially closing the valve 38, a pressure differential is caused to appear across the valve 38 and the pressure $P_x$ at port 37 is thus raised to a value above atmospheric pressure, the amount depending upon the degree of constriction by valve 38. Therefore the quantity $Q_2$ of gases flowing to the separator 12 is proportionally reduced since $$Q_2 \cong (P_1 - P_x)K \qquad (3)$$

wherein $K$ is a proportionality constant.

Consequently, the split ratio S may be altered to a new value S' by partially closing valve 38 so as to effect a change in $P_x$ above the atmospheric pressure $P_o$ at the exhaust exits 32 and 39 and S' may be determined by the approximate relationship $$S' \cong S(P_1 - P_o/P_1 - P_x) \qquad (4)$$

Although $P_1$ is not entirely independent of $P_x$, it is possible to use this apparatus to vary the split ratio S from its normally fixed value of 0.1 to as high as 0.99. It should be noted that this is accomplishable without any mechanical alteration whatsoever of the flow path between chromatograph 10 and spectrometer 12.

In actual practice approximately 0.2 percent of the chromatographic effluent will be passed through the membrane 14 into the spectrometer 12 so that the actual maximum flow through the detector 30 when valve 38 is fully closed is approximately 0.998. Accordingly, the flow of the solvent peak, which might otherwise be too large for the mass spectrometer 12 to handle, can be reduce to approximately 0.2 percent of the original injected quantity. This is a quite acceptable level in most cases and means that as large as a $5\mu l$ injection of sample into the chromatograph could be handled.

In addition to the previously described utilization the apparatus can be adapted to permit the selective control of the percentage of organic vapor which is allowed to reach the mass spectrometer inlet 12. In order to perform this control function an operator can watch the recorded output of the spectrometer 12 and manually adjust the valve means 38, or an electronic detector means 40 can be used to monitor the output of either the gas chromatograph 10 or the spectrometer 12 and upon sensing a predetermined characteristic, i.e., signal amplitude, rate of change, etc., provide a control signal to a valve control means 42 for automatically performing the desired function.

Since, according to equation (1), the effect of varying the split ratio S is to increase the flow of sample through the flame detector 30, the attenuation control of the recorder 34 can also be coupled to the valve control means 42 in order that the recorded output of the chromatograph be simultaneously adjusted so as to contain meaningful information.

Figure 2:
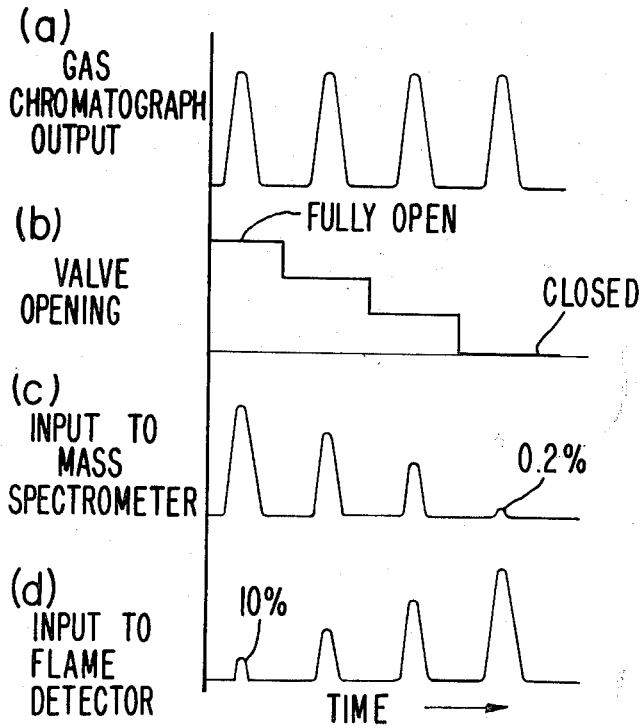
FIG. 2 is a time diagram illustrating operation of the apparatus in accordance with the present invention.

The operation of the present invention can be described by way of example by referring to FIG. 2 wherein four gas chromatograph (GC) peaks of equal size are shown in part (a). Part (b) indicates four different closure settings of valve 38, each coinciding in time with one of the peaks of part (a), and parts (c) and (d) illustrate the quantity of sample which is caused to flow to the mass spectrometer 12 and detector 30 respectively, as the throttle valve 38 is closed to constrict the fluid passage at the exhaust port 37 of separator 14.

With the valve 38 fully open the splitter 22 (with split ratio $S = 0.1$) causes the GC effluent to be split into two paths such that 10 percent of the effluent is directed through conduit 28 to flame detector 30 and 90 percent is allowed to continue through the connecting tabulation 24 to separator 14. As indicated in parts (c) and (d) the constricting of the flow path by valve 38 causes the ratio of flows in the respective paths to be increased in approximate proportion to the degree of constriction. However, where the valve 38 is completely closed approximately 0.2 percent of the sample still flows into the separator 14 since that is the approximate rate at which the sample material is caused to permeate through the membrane 36 to the mass spectrometer 12. The remainder of the chromatographic effluent is thus caused to flow through conduit 28 and into flame detector 30.

The advantages of this invention should now be readily apparent: in accordance with the invention there is no need to interrupt or adjust any point in the connective tubulation between the chromatograph and the spectrometer in order to alter the amount of sample introduced into the spectrometer; there are no valves interposed into the connecting flow path which could introduce extraneous contaminates into the flow stream; an all glass flow system can be utilized since there is no requirement that the valve 38 be completely leakproof; and furthermore, the invention permits the amount of sample supplied to the mass spectrometer to be either manually or automatically controlled.

After having read the above disclosure, many more alterations and modifications of the invention will be apparent to those of skill in the art and it is to be understood that this description of preferred embodiments is for purposes of illustration only and is in no manner intended to be limiting in any way. Accordingly, I intend that the appended claims be interpreted as covering all modifications which fall within the true spirit and scope of my invention.

I claim:

1. In a gas analyzing system including a gas chromatograph means, a mass spectrometer means, and an effluent flow path means extending therebetween, said flow path means including the input chamber of a membrane type separator means which serves as an inlet means to said mass spectrometer, and a viscous flow splitter means disposed in said flow path means between said chromatograph column and said separator for normally removing a small percentage of the effluent from said flow path for detection purposes, the improvement comprising: throttle valve means disposed in said flow path means downstream of said separator for impeding the flow of gas in said flow path and thus increasing the percentage of the effluent which is caused to pass out of said flow path through said splitter means and therefore reducing the percentage of the effluent supplied to said inlet means of said mass spectrometer.

2. In a gas analyzing system as recited in claim 1 wherein valve control means responsive to the output of said gas chromatograph or said mass spectrometer are provided for controlling said throttle valve means to control the amount of sample which is allowed to be introduced into said mass spectrometer.

3. In a gas analyzing system including a gas chromatograph means and a mass spectrometer means operatively coupled together by a gas flow means so as to serially perform an analysis on a sample of gaseous material, the output of said gas chromatograph being directly coupled through said gas flow means in flowthrough relation to the inlet system of said mass spectrometer, said gas flow means extending externally beyond said inlet system, and a fixed ratio splitter means disposed in the connecting path of said flow means between said gas chromatograph and said inlet system the improvement comprising: throttle valve means disposed in the external portion of said gas flow means beyond said inlet system for controlling the actual division of gas flow through the respective flow passages of said splitter means without altering the physical relationship of said flow passages.

4. In a gas analyzing system as recited in claim 3 wherein throttle valve control means responsive to the output of said gas chromatograph or said mass spectrometer means are provided for controlling said throttle valve means to control the percentage of sample gas which is caused to flow through said inlet system.

5. In a gas analyzing system as recited in claim 4 wherein said inlet system is a permeable membrane type separator.

6. A gas analyzing system comprising:
a gas chromatograph means having an effluent orifice,
a mass spectrometer means including an inlet means which separates certain materials from a sample gas caused to flow through an input chamber thereof, the downstream side of said input chamber having an exhaust port means through which said gas is exhausted after having passed through said input chamber,
fluid flow path means connecting said effluent orifice of said chromatograph to said inlet means of said spectrometer, flow splitting means disposed within said flow path means for splitting off a portion of a gas passing through said flow path means, said portion ultimately being exhausted through a second exhaust port means, and throttle valve means disposed at at least one of said exhaust ports for controlling the split ratio of said flow splitting means by constricting the flow passage through which the gas is passed before being exhausted thereby altering the balance of pressure drops between the respective exhaust ports and the splitting means which as a consequence alters the split ratio of said splitting means.

7. A gas analyzing system as set forth in claim 6 wherein said inlet means is a permeable membrane type separator means.

8. A gas analyzing system as set forth in claim 7 wherein throttle valve control means are provided responsive to a predetermined characteristic of said sample gas so as to control the application of said gas to said inlet means.

* * * * *